US010655194B2

(12) United States Patent
Honda et al.

(10) Patent No.: US 10,655,194 B2
(45) Date of Patent: May 19, 2020

(54) HIGH-STRENGTH STEEL SHEET AND METHOD FOR PRODUCING THE SAME

(71) Applicant: JFE STEEL CORPORATION, Tokyo (JP)

(72) Inventors: Yuma Honda, Fukuyama (JP); Yoshimasa Funakawa, Chiba (JP); Kozo Harada, Bekasi (ID)

(73) Assignee: JFE STEEL CORPORATION, Tokyo (JP)

( * ) Notice: Subject to any disclaimer, the term of this patent is extended or adjusted under 35 U.S.C. 154(b) by 297 days.

(21) Appl. No.: 15/561,365

(22) PCT Filed: Mar. 18, 2016

(86) PCT No.: PCT/JP2016/001597
§ 371 (c)(1),
(2) Date: Sep. 25, 2017

(87) PCT Pub. No.: WO2016/152135
PCT Pub. Date: Sep. 29, 2016

(65) Prior Publication Data
US 2018/0080099 A1 Mar. 22, 2018

(30) Foreign Application Priority Data

Mar. 25, 2015 (JP) .................................. 2015-062044

(51) Int. Cl.
*C21D 9/46* (2006.01)
*C21D 8/02* (2006.01)
(Continued)

(52) U.S. Cl.
CPC ................ *C21D 9/46* (2013.01); *B32B 15/00* (2013.01); *B32B 15/01* (2013.01); *B32B 15/013* (2013.01); *B32B 15/04* (2013.01); *B32B 15/043* (2013.01); *B32B 15/18* (2013.01); *C21D 6/004* (2013.01); *C21D 6/005* (2013.01); *C21D 6/008* (2013.01); *C21D 8/0205* (2013.01); *C21D 8/0263* (2013.01); *C21D 8/0273* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/18* (2013.01); *C22C 38/20* (2013.01); *C22C 38/26* (2013.01); *C22C 38/48* (2013.01); *C22C 38/54* (2013.01); *C23C 2/02* (2013.01); *C23C 2/04* (2013.01); *C23C 2/06* (2013.01); *C23C 2/26* (2013.01); *C23C 2/28* (2013.01); *C23C 2/40* (2013.01); *C23C 28/3225* (2013.01); *C23C 30/00* (2013.01);
(Continued)

(58) Field of Classification Search
CPC .. C21D 8/0273; C21D 8/0205; C21D 8/0226; C21D 8/0236; C21D 8/0263; C21D 2211/009; C21D 2211/005; C21D 9/46; C21D 6/008; C21D 6/005; C21D 6/004; C23C 2/40; C23C 2/28; C23C 2/02; C23C 2/06; C23C 2/04; C23C 2/26; C23C 30/00; C23C 30/005; C23C 28/3225; C22C 38/12; C22C 38/54; C22C 38/16; C22C 38/04; C22C 38/02; C22C 38/002; C22C 38/001; C22C 38/48; C22C 38/06; C22C 38/00; C22C 38/08; C22C 38/18; C22C 38/20; C22C 38/26; B32B 15/013; B32B 15/01; B32B 15/04; B32B 15/043; B32B 15/18; B32B 15/00; Y10T 428/12799; Y10T 428/12951; Y10T 428/12972; Y10T 428/12958
See application file for complete search history.

(56) References Cited

U.S. PATENT DOCUMENTS 5,074,926 A 12/1991 Tosaka et al.
2006/0292391 A1* 12/2006 Ikematsu ................ C22C 38/02
428/659
(Continued)

FOREIGN PATENT DOCUMENTS

CN 1051764 A 5/1991
CN 1771344 A 5/2006
(Continued)

OTHER PUBLICATIONS

Nov. 9, 2018 Office Action issued in Korean Application No. 10-2017-7027033.
(Continued)

*Primary Examiner* — Michael E. La Villa
(74) *Attorney, Agent, or Firm* — Oliff PLC

(57) ABSTRACT

A high-strength steel sheet having a high yield ratio and excellent stretch flangeability, and a method for producing the high-strength steel sheet. The high-strength steel sheet has a composition containing, by mass: C: 0.02% or more and less than 0.10%, Si: less than 0.10%, Mn: less than 1.0%, P: 0.10% or less, S: 0.020% or less, Al: 0.01% or more and 0.10% or less, N: 0.010% or less, Nb: 0.005% or more and less than 0.070%, and the balance being Fe and inevitable impurities; and a microstructure including, by area: ferrite: 85% or more, pearlite: 0% to 15%, and a total of martensite, retained austenite and cementite: 0% to 3%. The average crystal grain diameter of the ferrite is 15.0 µm or less. The grain diameter of a Nb carbide is 5 to 50 nm. The amount of Nb carbide precipitate is 0.005% to 0.050% in terms of volume fraction.

17 Claims, No Drawings

(51) Int. Cl.

| | | |
|---|---|---|
| *C21D 6/00* | (2006.01) | |
| *C22C 38/54* | (2006.01) | |
| *C22C 38/48* | (2006.01) | |
| *C22C 38/16* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *C23C 2/28* | (2006.01) | |
| *B32B 15/01* | (2006.01) | |
| *C22C 38/12* | (2006.01) | |
| *C23C 2/06* | (2006.01) | |
| *C23C 2/40* | (2006.01) | |
| *C23C 2/02* | (2006.01) | |
| *C23C 30/00* | (2006.01) | |
| *C22C 38/20* | (2006.01) | |
| *C23C 2/26* | (2006.01) | |
| *C23C 28/00* | (2006.01) | |
| *C22C 38/18* | (2006.01) | |
| *C22C 38/26* | (2006.01) | |
| *C23C 2/04* | (2006.01) | |
| *C22C 38/08* | (2006.01) | |
| *B32B 15/04* | (2006.01) | |
| *B32B 15/18* | (2006.01) | |
| *B32B 15/00* | (2006.01) | |

(52) U.S. Cl.
CPC .......... *C23C 30/005* (2013.01); *C21D 8/0226* (2013.01); *C21D 8/0236* (2013.01); *C21D 2211/005* (2013.01); *C21D 2211/009* (2013.01); *Y10T 428/12799* (2015.01); *Y10T 428/12951* (2015.01); *Y10T 428/12958* (2015.01); *Y10T 428/12972* (2015.01)

(56) References Cited

U.S. PATENT DOCUMENTS

2008/0202639 A1    8/2008  Tomida et al.
2012/0018055 A1*   1/2012  Nakagawa ........... C21D 8/0442
                                                            148/505

FOREIGN PATENT DOCUMENTS

| EP | 0 432 498 A2 | 6/1991 |
| EP | 1 193 322 A1 | 4/2002 |
| EP | 1612288 A1 | 1/2006 |
| EP | 2 762 580 A1 | 8/2014 |
| JP | H06-322479 A | 11/1994 |
| JP | 2007-217736 A | 8/2007 |
| JP | 2009/108378 A | 5/2009 |
| JP | 2010265545 A | 11/2010 |
| JP | 4740099 B2 | 8/2011 |
| JP | 4995109 B2 | 8/2012 |
| KR | 2002-0036838 A | 5/2002 |
| WO | 2007015541 A1 | 2/2007 |
| WO | 2013/157222 A1 | 10/2013 |

OTHER PUBLICATIONS

Jul. 2, 2018 Office Action issued in Chinese Patent Application No. 201680018214.9.
Jun. 5, 2018 Extended European Search Report issued in European Patent Application No. 16768042.0.
Mar. 14, 2019 Office Action issued in Korean Patent Application No. 10-2017-7027033.

* cited by examiner

HIGH-STRENGTH STEEL SHEET AND METHOD FOR PRODUCING THE SAME

TECHNICAL FIELD

This application relates to a high-strength steel sheet used as a material for automotive components or the like and a method for producing the high-strength steel sheet.

BACKGROUND

High-strength steel sheets have been suitably used as a material for automotive components or the like, for example, in order to reduce the weight of the components by reducing the thickness of the material. For example, frame components and crash-resistant components are required to be resistant to deformation at the time of impact in order to ensure the safety of vehicle occupants. That is, these components are required to have a high yield ratio. As a material for these components, high-strength steel sheets having excellent stretch flangeability are desirably used in order to consistently produce the components by press forming without the occurrence of cracking. There have been disclosed various steel sheets and techniques for producing the steel sheets in response to the above demand.

Patent Literature 1 discloses a high-strength steel sheet having excellent paint-baking hardenability, the steel sheet including Nb and Ti at a content of 0.01% or more in total and a main phase that is ferrite having a recrystallization ratio of 80% or more, and a method for producing the high-strength steel sheet.

Patent Literature 2 discloses a high-strength steel sheet having excellent collision resistance and excellent stretch flangeability, the high-strength steel sheet having a microstructure including 20% to 50% unrecrystallized ferrite, and a method for producing the high-strength steel sheet.

Patent Literature 3 discloses a hot-dip zinc coated high-strength steel sheet having excellent stretch flangeability (hole expandability), the high-strength steel sheet containing one or more elements selected from V, Ti, and Nb and including a main phase that is ferrite or bainite, wherein the amount of iron carbide precipitated at the grain boundaries is limited to be a specific amount and the maximum particle diameter of the iron carbide is controlled to be 1 µm or less, and a method for producing the hot-dip zinc coated high-strength steel sheet.

CITATION LIST

Patent Literature

PTL 1: Japanese Patent No. 4740099
PTL 2: Japanese Patent No. 4995109
PTL 3: Japanese Unexamined Patent Application Publication No. H6-322479

SUMMARY

Technical Problem

However, the addition of 0.005% or more Ti is essential in the technique described in Patent Literature 1. Moreover, in Patent Literature 1, a steel sheet having a high yield ratio is not produced. A high-strength steel sheet having a high yield ratio and excellent stretch flangeability is not produced by the technique described in Patent Literature 2, where the amounts of Nb and Ti added and the annealing temperature are controlled in order to utilize unrecrystallized ferrite, because unrecrystallized ferrite has lower ductility than recrystallized ferrite. It is considered that a high-strength steel sheet having a high yield ratio and excellent stretch flangeability is not produced by the technique described in Patent Literature 3.

In view of the above circumstances, the disclosed embodiments were made in order to address the issues. It is an object of the disclosed embodiments to provide a high-strength steel sheet having a high yield ratio and excellent stretch flangeability.

Solution to Problem

The inventors conducted extensive studies in order to address the above issues and, as a result, found that it is important to form a microstructure primarily composed of ferrite in which the average diameter of ferrite crystal grains is reduced to a specific diameter or less and the volume fraction and particle diameter of Nb carbide are controlled to be adequate. It was also found that, in order to achieve this, it is effective to adjust the steel composition to be a predetermined composition and control the coiling temperature after hot-rolling, the soaking temperature in the annealing treatment, and the amount of time during which holding is performed in each temperature range to be within an adequate range.

The disclosed embodiments were made on the basis of the above findings. The summary of the disclosed embodiments is as follows.

[1] A high-strength steel sheet including a composition containing, by mass, C: 0.02% or more and less than 0.10%, Si: less than 0.10%, Mn: less than 1.00%, P: 0.10% or less, S: 0.020% or less, Al: 0.01% or more and 0.10% or less, N: 0.010% or less, Nb: 0.005% or more and less than 0.070%, and the balance being Fe and inevitable impurities, and a microstructure including, by area, ferrite: 85% or more, pearlite: 0% to 15%, and the total of martensite, retained austenite and cementite: 0% to 3%, wherein an average crystal grain diameter of the ferrite is 15.0 µm or less, and wherein a grain diameter of a Nb carbide is 5 to 50 nm, and the amount of Nb carbide precipitate is 0.005% to 0.050% in terms of volume fraction.

[2] The high-strength steel sheet described in [1], wherein the composition further contains one or more elements selected from, by mass, Cr: 0.3% or less, Mo: 0.3% or less, B: 0.005% or less, Cu: 0.3% or less, and Ni: 0.3% or less.

[3] The high-strength steel sheet described in [1] or [2], provided with a hot-dip galvanizing layer deposited on a surface of the high-strength steel sheet.

[4] The high-strength steel sheet described in [3], wherein the hot-dip galvanizing layer is a galvannealed layer.

[5] A method for producing a high-strength steel sheet, the method including hot-rolling a slab having the composition described in [1] or [2]; cooling the resulting hot-rolled steel sheet such that the hot-rolled steel sheet is held in a temperature range of a finish-rolling temperature to 650° C. for 10 seconds or less; coiling the hot-rolled steel sheet at 500° C. to 700° C.; cold-rolling the hot-rolled steel sheet; and subjecting the resulting cold-rolled steel sheet to an annealing treatment in a continuous annealing furnace, the annealing treatment including holding the cold-rolled steel sheet in a temperature range of 650° C. to 750° C. for 15 seconds or more when heating is performed and subsequently soaking the cold-rolled steel sheet with a soaking temperature of 760° C. to 880° C. for a soaking time of 120 seconds or less.

[6] The method for producing a high-strength steel sheet described in [5], the method further including, subsequent to the annealing treatment, performing hot-dip galvanizing on a surface of the high-strength steel sheet.

[7] The method for producing a high-strength steel sheet described in [6], the method further including subjecting the hot-dip galvanizing layer to an alloying treatment.

Advantageous Effects

In the disclosed embodiments, the composition of the steel sheet and the production conditions, such as the conditions under which the hot-rolled steel sheet is coiled, the soaking temperature in the annealing treatment, and the amount of time during holding in each temperature range, are adequately controlled. This makes it possible to form the microstructure targeted in the disclosed embodiments and, as a result, to consistently produce a high-strength steel sheet having a high yield ratio and excellent stretch flangeability which are required in the application of automotive components or the like. The high-strength steel sheet according to the disclosed embodiments enables further reduction in the weight of vehicles. The disclosed embodiments are considerably valuable in the automotive industry and the steelmaking industry.

DETAILED DESCRIPTION

The disclosed embodiments are described below. The disclosure is not limited by the following embodiments.

First, the high-strength steel sheet according to the disclosed embodiments is outlined below.

The high-strength steel sheet according to the disclosed embodiments has a tensile strength of 330 MPa or more and less than 500 MPa, a yield ratio of 0.70 or more, and a hole expansion ratio of 130% or more. Since the high-strength steel sheet according to the disclosed embodiments has a hole expansion ratio of 130% or more, the high-strength steel sheet according to the disclosed embodiments has excellent stretch flangeability.

The high-strength steel sheet having a high yield ratio and excellent stretch flangeability can be produced by achieving a composition including 0.005% or more Nb and a microstructure composed of an essential structure that is ferrite and optional structures, such as pearlite, in which the average crystal grain diameter of the ferrite is 15.0 µm or less, the particle diameter of a Nb carbide is 5 to 50 nm, and the amount of Nb carbide precipitate is 0.005% to 0.050% in terms of volume fraction. Note that, the term "Nb carbides" used herein also refers to Nb carbonitrides.

The production conditions are important as well as the composition in order to satisfy the desired conditions regarding the average diameter of ferrite crystal grains and Nb carbide. Specifically, it is important to hold the hot-rolled steel sheet in the temperature range of the finish-rolling temperature to 650° C. for 10 seconds or less when cooling is performed subsequent to hot rolling; to maintain coiling temperature of the hot-rolled steel sheet between 500° C. and 700° C.; to hold the steel sheet in the temperature range of 650° C. to 750° C. for 15 seconds or more when heating is performed in the annealing treatment; and to subsequently hold the steel sheet at a soaking temperature of 760° C. to 880° C. for 120 seconds or less. It is considered that, uniformly precipitating fine Nb carbide particles when cooling is performed subsequent to coiling and, subsequent to cold rolling, recrystallizing ferrite at a relatively low temperature in the annealing treatment enable fine ferrite grains to be formed and limit increases in the size of ferrite grains and Nb carbide particles which occur during soaking.

The yield strength and tensile strength of the steel sheet are determined by taking a JIS No. 5 tensile test specimen such that the tensile direction of the specimen is perpendicular to the rolling direction of the steel sheet and subjecting the specimen to a tensile test conforming to JIS Z 2241. The hole expansion ratio of the steel sheet is determined by a hole-expansion test described in JIS Z 2256.

The high-strength steel sheet according to the disclosed embodiments, which is made on the basis of the above findings, has a high yield ratio and excellent stretch flangeability which are required by materials for automotive components or the like.

The reasons for the limitations on the composition of the steel sheet according to the disclosed embodiments, the reasons for the limitations on the microstructure of the steel sheet, and the reasons for the limitations on the production conditions are described below. When referring to the content of a constituent in the following description, "%" refers to "% by mass".

(1) Composition

The high-strength steel sheet according to the disclosed embodiments contains, by mass, C: 0.02% or more and less than 0.10%, Si: less than 0.10%, Mn: less than 1.00%, P: 0.10% or less, S: 0.020% or less, Al: 0.01% or more and 0.10% or less, N: 0.010% or less, and Nb: 0.005% or more and less than 0.070%. The high-strength steel sheet according to the disclosed embodiments may further contain, as optional constituents, one or more elements selected from, by mass, Cr: 0.3% or less, Mo: 0.3% or less, B: 0.005% or less, Cu: 0.3% or less, and Ni: 0.3% or less. The balance other than the above constituents includes Fe and inevitable impurities.

C: 0.02% or More and Less than 0.10%

Carbon (C) is an element capable of increasing the yield strength and tensile strength of the steel sheet by forming Nb carbides and increasing the amounts of pearlite and martensite. If the C content is less than 0.02%, the desired amount of Nb carbide may fail to be achieved and, as a result, the tensile strength targeted in the disclosed embodiments may fail to be achieved. If the C content is 0.10% or more, the diameter of the Nb carbide particles and the diameter of ferrite grains are excessively increased. In addition, excessively large amounts of pearlite and martensite are formed. This reduces the yield ratio of the steel sheet and degrades the stretch flangeability of the steel sheet. Accordingly, the C content is limited to be 0.02% or more and less than 0.10% and is preferably 0.02% or more and 0.06% or less.

Si: Less than 0.10%

In general, silicon (Si) effectively increases the yield strength and tensile strength of the steel sheet by the solid-solution strengthening of ferrite. However, adding Si to the steel sheet significantly enhances strain hardenability and increases the tensile strength of the steel sheet by an amount larger than the increase in the yield strength of the steel sheet. This results in a reduction in the yield ratio and degrades the quality of the surface of the steel sheet. Accordingly, the Si content is limited to be less than 0.10%. The lower limit if the Si content is not specified. The Si content is preferably reduced to a minimum level. The Si content may be 0% in principle, but is commonly 0.001% or more in the industrial application.

Mn: Less than 1.0%

Manganese (Mn) increases the yield strength and tensile strength of the steel sheet by the solid-solution strengthening of ferrite. If the Mn content is 1.0% or more, the fraction of martensite in the microstructure is increased and, consequently, the tensile strength of the steel sheet is excessively increased. This results in failure to achieve the tensile strength targeted in the disclosed embodiments, a reduction in yield ratio, and degradation of stretch flangeability. Accordingly, the Mn content is limited to be less than 1.0% and is preferably 0.2% or more and 0.8% or less.

P: 0.10% or Less

Since phosphorus (P) increases the yield strength and tensile strength of the steel sheet by the solid-solution strengthening of ferrite, the steel sheet according to the disclosed embodiments may include a certain amount of P. However, if the P content exceeds 0.10%, the ferrite grain boundaries may become brittle as a result of casting segregation or ferrite-intergranular segregation and, consequently, the stretch flangeability of the steel sheet may be degraded. Accordingly, the P content is limited to be 0.10% or less. The P content may be 0% in principle, but is preferably 0.01% or more and 0.04% or less.

S: 0.020% or Less

Sulfur (S) is an element inevitably contained in the steel sheet. The S content is preferably reduced to a minimum level, because the formation of MnS and the like degrades the stretch flangeability and local elongation of the steel sheet. Accordingly, the S content is limited to be 0.020% or less in the disclosed embodiments and is preferably 0.015% or less. The S content may be 0% in principle, but is commonly 0.0001% or more in the industrial application.

Al: 0.01% or More and 0.10% or Less

Aluminum (Al) is used in the refining step in order to perform deoxidation and fix solute N in the form of AlN. The amount of Al required for achieving the above advantageous effects at a sufficient level is 0.01% or more. However, if the Al content exceeds 0.10%, an excessively large amount of AlN may precipitate, which degrades the stretch flangeability of the steel sheet. Accordingly, the Al content is limited to be 0.01% or more and 0.10% or less, is preferably 0.01% or more and 0.07% or less, and is further preferably 0.01% or more and 0.06% or less.

N: 0.010% or Less

Nitrogen (N) is an element inevitably added to steel in the molten-iron-refining step or a step upstream of the molten-iron-refining step. If the N content exceeds 0.01%, Nb carbide precipitates during casting. The Nb carbide particles do not dissolve in the following slab-heating treatment and remain in the form of coarse carbide particles, which increase the average size of ferrite crystal grains. Accordingly, the N content is limited to be 0.010% or less. The N content may be 0% in principle, but is commonly 0.0001% or more in the industrial application.

Nb: 0.005% or More and Less than 0.070%

Niobium (Nb) is an important element that increases the yield ratio of the steel sheet by reducing the average size of ferrite crystal grains and precipitating in the form of Nb carbides. If the Nb content is less than 0.005%, the above advantageous effect may be degraded because a sufficient volume fraction of Nb carbide fails to be formed. If the Nb content is 0.070% or more, the amount of Nb carbide precipitate is excessively increased and unrecrystallized ferrite, which has poor ductility, may remain even after annealing has been performed. This degrades the stretch flangeability of the steel sheet. Accordingly, the Nb content is limited to be 0.005% or less and less than 0.070% and is preferably 0.010% or more and 0.040% or less.

The high-strength steel sheet according to the disclosed embodiments may contain the following constituents as optional constituents.

Cr: 0.3% or Less

Chromium (Cr) may be added to the steel sheet as a trace element that does not impair the advantageous effects of the disclosed embodiments. If the Cr content exceeds 0.3%, hardenability is enhanced and, consequently, an excessively large amount of martensite is formed. This may reduce the yield ratio of the steel sheet. Accordingly, when Cr is added to the steel sheet, the Cr content is limited to be 0.3% or less.

Mo: 0.3% or Less

Molybdenum (Mo) may be added to the steel sheet as a trace element that does not impair the advantageous effects of the disclosed embodiments. If the Mo content exceeds 0.3%, hardenability is enhanced and, consequently, an excessively large amount of martensite is formed. This may reduce the yield ratio of the steel sheet. Accordingly, when Mo is added to the steel sheet, the Mo content is limited to be 0.3% or less.

B: 0.005% or Less

Boron (B) may be added to the steel sheet as a trace element that does not impair the advantageous effects of the disclosed embodiments. If the B content exceeds 0.005%, hardenability is enhanced and, consequently, an excessively large amount of martensite is formed. This may reduce the yield ratio of the steel sheet. Accordingly, when B is added to the steel sheet, the B content is limited to be 0.005% or less.

Cu: 0.3% or Less

Copper (Cu) may be added to the steel sheet as a trace element that does not impair the advantageous effects of the disclosed embodiments. If the Cu content exceeds 0.3%, hardenability is enhanced and, consequently, an excessively large amount of martensite is formed. This may reduce the yield ratio of the steel sheet. Accordingly, when Cu is added to the steel sheet, the Cu content is limited to be 0.3% or less.

Ni: 0.3% or Less

Nickel (Ni) may be added to the steel sheet as a trace element that does not impair the advantageous effects of the disclosed embodiments. If the Ni content exceeds 0.3%, hardenability is enhanced and, consequently, an excessively large amount of martensite is formed. This may reduce the yield ratio of the steel sheet. Accordingly, when Ni is added to the steel sheet, the Ni content is limited to be 0.3% or less.

The balance other than the above-described constituents includes Fe and inevitable impurities. The steel sheet according to the disclosed embodiments may also contain, in addition to the above-described constituents, elements such as Ti, V, Sn, Sb, Co, W, Ca, Na, and Mg, as inevitable impurities, in trace amounts such that the advantageous effects of the disclosed embodiments are not impaired.

(2) Microstructure

The microstructure of the high-strength steel sheet according to the disclosed embodiments includes, by area, ferrite: 85% or more, pearlite: 0% to 15%, and the total of martensite, retained austenite and cementite: 0% to 3%. In the microstructure of the steel sheet, the average diameter of ferrite crystal grains is 15.0 μm or less, the diameter of Nb carbide particles is 5 to 50 nm, and the amount of Nb carbide precipitate is 0.005% to 0.050% in terms of volume fraction.

Ferrite: 85% or More

Ferrite, which has good ductility, is the main phase of the microstructure of the steel sheet. The ferrite content is 85% or more by area. If the ferrite content is less than 85% by area, the high yield ratio and excellent stretch flangeability of the steel sheet which are targeted in the disclosed embodiments may fail to be achieved. Accordingly, the ferrite content is limited to be 85% or more by area and is preferably 95% or more by area. The microstructure of the steel sheet according to the disclosed embodiments may be composed of the ferrite phase only (the ferrite content may be 100% by area).

Pearlite: 0% to 15%

Pearlite is effective for achieving the desired yield strength and tensile strength. However, if the pearlite content exceeds 15% by area, the high yield ratio and excellent stretch flangeability of the steel sheet which are targeted in the disclosed embodiments may fail to be achieved. Accordingly, the pearlite content is limited to be 0% to 15% by area and is preferably 0% to 5% by area.

Total of Martensite, Retained Austenite and Cementite: 0% to 3%

The microstructure of the high-strength steel sheet may include martensite, retained austenite and cementite at a content of 0% to 3% in total. If the total content of martensite, retained austenite and cementite exceeds 3%, a yield ratio of 0.70 or more may fail to be achieved. Accordingly, the total content of martensite, retained austenite and cementite is limited to be 0% to 3%.

Average Diameter of Ferrite Crystal Grains: 15.0 µm or Less

Adjusting the average diameter of ferrite crystal grains to be within the desired range is important for achieving a high yield ratio of 0.70 or more, which is targeted in the disclosed embodiments. If the average diameter of ferrite crystal grains exceeds 15.0 µm, a yield ratio of 0.70 or more may fail to be achieved. Accordingly, the average diameter of ferrite crystal grains is limited to be 15.0 µm or less and is preferably 10.0 µm or less. Although the lower limit of the average diameter of ferrite crystal grains is not specified, the average diameter of ferrite grains is preferably 1.0 µm or more because, if the average diameter of ferrite crystal grains is less than 1.0 µm, the tensile strength and yield strength of the steel sheet may be excessively increased and, consequently, the stretch flangeability and the elongation of the steel sheet may be degraded.

Diameter of Nb Carbide Particles: 5 to 50 nm

Nb carbide particles, which are primarily composed of NbC, precipitate mainly inside ferrite grains. The diameter of the Nb carbide particles is important for achieving the high yield ratio and excellent stretch flangeability that are targeted in the disclosed embodiments. If the diameter of the Nb carbide particles is less than 5 nm, the yield strength of the steel sheet is excessively increased to deviate from the range targeted in the disclosed embodiments. In addition, the stretch flangeability of the steel sheet may be degraded. On the other hand, if the diameter of the Nb carbide particles exceeds 50 nm, the yield strength of the steel sheet may fail to be increased by a sufficient degree and, consequently, the high yield ratio targeted in the disclosed embodiments may fail to be achieved.

Accordingly, the diameter of the Nb carbide particles is limited to be 5 to 50 nm and is preferably 10 nm or more and 30 nm or less.

Amount of Nb Carbide Precipitate: 0.005% to 0.050% in Terms of Volume Fraction

Adjusting the amount of Nb carbide precipitate to be within the desired range is important for achieving the high yield ratio and excellent stretch flangeability that are targeted in the disclosed embodiments. If the amount of Nb carbide precipitate is less than 0.005% in terms of volume fraction, the yield strength of the steel sheet may fail to be increased by a sufficient degree and, as a result, the high yield ratio targeted in the disclosed embodiments may fail to be achieved. On the other hand, if the amount of Nb carbide precipitate exceeds 0.050% in terms of volume fraction, the recrystallization of ferrite is significantly reduced, which degrades the stretch flangeability of the steel sheet. If the amount of Nb carbide precipitate exceeds 0.050% in terms of volume fraction, furthermore, the tensile strength of the steel sheet may be excessively increased to deviate from the range targeted in the disclosed embodiments. Accordingly, the amount of Nb carbide precipitate is limited to be 0.005% to 0.050% and is preferably 0.010% or more and 0.030% or less in terms of volume fraction.

The area fraction of each microstructure is determined by a point-count method described in ASTM E 562-05 using the results of an SEM observation of a specific region of a thickness-direction cross section of the steel sheet which is perpendicular to the rolling width direction, the specific region extending from a position ⅛ the thickness of the steel sheet from the surface of the steel sheet to a position ⅜ the thickness from the surface of the steel sheet with the center being a position ¼ the thickness from the surface of the steel sheet. The average diameter of ferrite crystal grains is determined by observing the specific region of the steel sheet, which extends from the ⅛-thickness position to the ⅜-thickness position with the center being the ¼-thickness position, with an SEM and then calculating the equivalent-circle diameter on the basis of the area observed and the number of the crystal grains. The diameter of Nb carbide particles is determined by preparing a thin-film sample from the high-strength steel sheet and then calculating the equivalent-circle diameter of the Nb carbide particles from a TEM image. The volume fraction of Nb carbide is determined by an extraction residual method.

(3) Production Conditions

The high-strength steel sheet according to the disclosed embodiments is produced by preparing a steel having the above-described composition, casting the steel into a slab, hot-rolling the slab, cold-rolling the resulting hot-rolled steel sheet, and annealing the resulting cold-rolled steel sheet in a continuous annealing furnace. The hot-rolled steel sheet may optionally be pickled. The limitations on the production conditions are described below. The term "temperature" used in the following description refers to surface temperature.

The casting method is not limited. Any casting method, such as an ingot-making method or a continuous casting method, that does not cause a significant segregation of composition or nonuniformity in microstructure may be used.

In the hot-rolling step, a cast slab having a high temperature may be rolled directly or after the slab has been cooled to room temperature and subsequently reheated. In the case where defects such as cracks are present on the surface of the slab, the slab may be repaired using a grinder or the like. When the slab is reheated, the slab is preferably heated to 1100° C. or more in order to dissolve Nb carbides.

In the hot-rolling step, the slab is subjected to rough rolling and finish rolling. The resulting hot-rolled steel sheet is coiled to form a hot-rolled coil. The conditions under which rough rolling is performed and the conditions under which finish rolling is performed in the hot-rolling step are not limited; they may be performed by a common method. However, if the finish-rolling temperature is lower than the $Ar_3$ point, coarse ferrite grains elongated in the rolling direction may be formed in the microstructure of the hot-rolled steel sheet, which may degrade the ductility of the steel sheet after annealing. Accordingly, the finish-rolling temperature is preferably the $Ar_3$ point or higher.

Holding Time in Temperature Range of Finish-Rolling Temperature to 650° C.: 10 Seconds or Less Since adequately controlling the amount of time during which holding is performed in the temperature range of the finish-rolling temperature to 650° C. limits an increase in the average diameter of ferrite crystal grains, the above cooling conditions are important in the disclosed embodiments. If the amount of time during which holding is performed in the temperature range of the finish-rolling temperature to 650° C. when cooling is performed subsequent to finish rolling exceeds 10 seconds, an excessively large amount of coarse Nb carbide particles may precipitate after coiling has been performed in the hot-rolling step. This increases the likelihood of the size of ferrite grains being increased during annealing and results in the formation of ferrite crystal grains having an average diameter of more than 15.0 µm, which reduces the yield ratio of the steel sheet. Accordingly, the amount of time during which holding is performed in the temperature range of the finish-rolling temperature to 650° C. in the above cooling step is limited to be 10 seconds or less. Although the lower limit of the holding time is not specified, it is preferable to perform holding for 1 second or more in order to uniformly precipitate Nb carbide particles and reduce the variation in the diameters of ferrite grains in the annealing treatment.

Coiling Temperature: 500° C. to 700° C.

The coiling temperature is important for controlling the average diameter of ferrite crystal grains formed by annealing to be 15.0 µm or less by adjusting the amount and diameter of Nb carbide particles precipitate. If the coiling temperature at the center of the steel sheet in the width direction is lower than 500° C., a sufficient amount of Nb carbide may fail to precipitate when cooling is performed subsequent to coiling. In addition, coarse Nb carbide particles precipitate when heating and soaking are performed in the annealing treatment. This increases the diameter of ferrite grains and results in failure to achieve the tensile strength and the high yield ratio targeted in the disclosed embodiments. If the coiling temperature exceeds 700° C., coarse Nb carbide particles precipitate when cooling is performed subsequent to coiling and the diameter of ferrite grains is excessively increased in the annealing treatment. This results in failure to achieve the tensile strength and the high yield ratio targeted in the disclosed embodiments. Accordingly, the coiling temperature is limited to be 500° C. to 700° C. and is preferably 550° C. to 650° C.

The cold-rolling step may be conducted by a common method. The rolling reduction is preferably 30% to 80%.

In the annealing treatment, the steel sheet is heated to the soaking temperature and subsequently cooled in a continuous annealing furnace.

Performing Holding at 650° C. to 750° C. for 15 Seconds or More when Heating is Performed The amount of time during which holding is performed at 650° C. to 750° C. when heating is performed is a production condition important for controlling the average diameter of ferrite crystal grains formed by annealing to be 15.0 µm or less. If the amount of time during which holding is performed at 650° C. to 750° C. when heating is performed is less than 15 seconds, the recrystallization of ferrite may fail to be completed while heating is performed, recrystallization may occur when soaking is performed at a relatively high temperature and, consequently, the average diameter of ferrite crystal grains is increased. Accordingly, the amount of time during which holding is performed at 650° C. to 750° C. when heating is performed is limited to be 15 seconds or more and is preferably 20 seconds or more. Although the upper limit of the holding time is not specified, the holding time is preferably 300 seconds or less, because an excessively large amount of holding time results in the coarsening of Nb carbide particles. The term "holding time" used herein refers to the amount of time during which the steel sheet is retained in the temperature range of 650° C. to 750° C.

Soaking Temperature: 760° C. to 880° C., Soaking Time: 120 Seconds or Less

The soaking temperature and the soaking time are requirements important for controlling the average diameter of ferrite crystal grains. If the soaking temperature is less than 760° C., the recrystallization of ferrite does not occur sufficiently and the stretch flangeability of the steel sheet is degraded. On the other hand, if the soaking temperature exceeds 880° C., the average diameter of ferrite crystal grains may be excessively increased and, as a result, the tensile strength and the yield ratio that are targeted in the disclosed embodiments may fail to be achieved. Accordingly, the soaking temperature is limited to be 760° C. to 880° C. If the soaking time exceeds 120 seconds, the average diameter of ferrite crystal grains may be excessively increased and, as a result, the tensile strength and the high yield ratio that are targeted in the disclosed embodiments may fail to be achieved. Accordingly, the soaking time is limited to be 120 seconds or less and is preferably 60 seconds or less. Although the lower limit of the soaking time is not specified, the soaking time is preferably 30 seconds or more, because it is preferable to completely recrystallize ferrite in consideration of stretch flangeability. The term "soaking time" used herein refers to the time during which the steel sheet is retained in the temperature range of 760° C. to 880° C.

The heating method used for heating or soaking is not limited; a radiant tube method and a direct heating method may be employed.

The conditions under which cooling is performed subsequent to soaking are not limited. For example, the cooling-stop temperature is 400° C. to 500° C., the average cooling rate is 30° C./s or less, and the amount of time during which holding is performed in the temperature range of 400° C. to 500° C. (the temperature range of 500° C. to the cooling-stop temperature) is 10 to 100 seconds.

A coating layer may be deposited on the surface of the high-strength steel sheet produced in the above-described manner. The type of coating is preferably hot-dip galvanizing, in which the steel sheet is dipped into a hot-dip galvanizing bath.

The resulting hot-dip galvanizing layer may be subjected to an alloying treatment to form a galvannealed layer. In the case where the alloying treatment is performed, a holding temperature lower than 450° C. does not allow the hot-dip galvanizing layer to be sufficiently alloyed and, as a result, the adhesion of the coating layer and corrosion resistance may be degraded. If the holding temperature exceeds 560° C., the degree of alloying may be excessively increased and trouble such as powdering may occur during pressing. Accordingly, the holding temperature is preferably 450° C. to 560° C. The holding time is preferably 5 seconds or more, because a holding time less than 5 seconds does not allow the hot-dip galvanizing layer to be sufficiently alloyed and, consequently, the adhesion of the coating layer and corrosion resistance may be degraded.

Subsequently, temper rolling with an elongation of 0.1% to 5.0% may be performed as needed.

The high-strength steel sheet targeted in the disclosed embodiments is produced in the above-described manner. In the case where a cold-rolled steel sheet is produced, electrogalvanizing or a surface treatment, such as a chemical conversion treatment or an organic coating treatment, may be further performed without impairing the characteristics of the steel sheet targeted in the disclosed embodiments.

EXAMPLES

The disclosed embodiments are described further in detail with reference to Examples below.

Slabs each prepared from a specific one of Steels A to M having the compositions shown in Table 1 were soaked at 1250° C. for 1 hour and subsequently formed into a hot-rolled steel sheet with a final thickness of 3.2 mm, a finish-rolling temperature of 900° C., which was higher than the Ar₃ point, and the holding time shown in Table 2. The hot-rolled steel sheets were each cooled and subsequently coiled at a specific one of the coiling temperatures shown in Table 2. The hot-rolled steel sheets were pickled and subsequently cold-rolled with a final thickness of 1.4 mm to form cold-rolled steel sheets. The cold-rolled steel sheets were each annealed under a specific one of the sets of conditions shown in Table 2. Hereby, the high-strength steel sheet Nos. 1 to 31 were prepared. In the case where coating was not performed, a CAL (continuous annealing line) was used for annealing. In the case where coating was performed, hot-dip galvanizing or a set of hot-dip galvanizing and alloying was performed using a CGL (continuous galvanizing/galvannealing line). In the case where the coating layer was formed into a galvannealed layer, an alloying treatment including holding at 510° C. for 10 seconds was performed.

The high-strength steel sheets were each inspected for microstructure and subjected to a tensile test.

The area fraction of each steel microstructure was determined by a point-count method described in ASTM E 562-05 using the results obtained by observing a specific region of a thickness-direction cross section of the steel sheet which was perpendicular to the rolling width direction, the specific region extending from a position ⅛ the thickness of the steel sheet from the surface of the steel sheet to a position ⅜ the thickness from the surface of the steel sheet with the center being a position ¼ the thickness from the surface of the steel sheet, under a magnification of 1000 times with an SEM. The average diameter of ferrite crystal grains was determined by observing a specific region of a thickness-direction cross section of the steel sheet which was perpendicular to the rolling width direction, the specific region extending from a position ⅛ the thickness of the steel sheet from the surface of the steel sheet to a position ⅜ the thickness from the surface of the steel sheet with the center being a position ¼ the thickness from the surface of the steel sheet, under a magnification of 1000 times with an SEM and then calculating the equivalent-circle diameter on the basis of the area observed and the number of the crystal grains. The diameter of Nb carbide particles is determined by observing Nb carbide particles with a TEM and then calculating an equivalent-circle diameter of the Nb carbide particles by an image analysis. The above observations were each made in ten fields of view, and the average thereof was calculated. Table 2 shows the results. In Table 2, α denotes ferrite, P denotes pearlite, M denotes martensite, and θ denotes cementite; "α grain diameter" refers to the average diameter of ferrite crystal grains; "Nb(C,N) particle diameter" refers to the diameter of Nb carbide particles; and "Nb(C,N) volume fraction" refers to the amount of Nb carbide precipitate.

The tensile strength (TS) and yield ratio (YR) of the steel sheet were determined by taking a JIS No. 5 tensile test specimen such that the tensile direction of the specimen was perpendicular to the rolling direction of the steel sheet and subjecting the specimen to a tensile test conforming to JIS Z 2241. The hole expansion ratio (λ) of the steel sheet was determined in accordance with JIS Z 2256. A steel sheet having a tensile strength of 330 MPa or more and less than 500 MPa, a yield ratio of 0.70 or more, and a hole expansion ratio of 130% or more was evaluated as being good.

TABLE 1

| | | | | | | | | | | mass % |
|---|---|---|---|---|---|---|---|---|---|---|
| Steel | C | Si | Mn | P | S | Al | N | Nb | Other | Category |
| A | 0.05 | 0.01 | 0.4 | 0.02 | 0.002 | 0.03 | 0.003 | 0.012 | | Invention example |
| B | 0.02 | 0.02 | 0.5 | 0.02 | 0.001 | 0.03 | 0.003 | 0.011 | | Invention example |
| C | 0.08 | 0.01 | 0.3 | 0.02 | 0.002 | 0.02 | 0.002 | 0.009 | | Invention example |
| <u>D</u> | <u>0.01</u> | 0.01 | 0.4 | 0.02 | 0.002 | 0.03 | 0.004 | 0.008 | | Comparative example |
| <u>E</u> | <u>0.12</u> | 0.03 | 0.5 | 0.01 | 0.003 | 0.04 | 0.003 | 0.011 | | Comparative example |
| F | 0.04 | 0.01 | 0.8 | 0.02 | 0.002 | 0.03 | 0.003 | 0.013 | | Invention example |
| <u>G</u> | 0.05 | 0.02 | <u>1.3</u> | 0.01 | 0.002 | 0.02 | 0.002 | 0.011 | | Comparative example |
| H | 0.04 | 0.01 | 0.5 | 0.02 | 0.003 | 0.03 | 0.004 | 0.007 | | Invention example |
| I | 0.04 | 0.01 | 0.6 | 0.02 | 0.002 | 0.04 | 0.003 | 0.038 | | Invention example |
| <u>J</u> | 0.05 | 0.02 | 0.5 | 0.02 | 0.002 | 0.02 | 0.004 | <u>0.002</u> | | Comparative example |
| <u>K</u> | 0.03 | 0.01 | 0.4 | 0.02 | 0.001 | 0.02 | 0.003 | <u>0.095</u> | | Comparative example |
| L | 0.08 | 0.02 | 0.3 | 0.01 | 0.002 | 0.03 | 0.003 | 0.015 | Cr:0.1, Ni:0.2, B:0.0011 | Invention example |
| M | 0.07 | 0.02 | 0.5 | 0.03 | 0.002 | 0.02 | 0.003 | 0.013 | Cu:0.1, Mo:0.1 | Invention example |

*Underlined items are outside the range of the disclosed embodiments.

TABLE 2

| | | Hot rolling | | Annealing and coating | | | | | Steel microstructure | | | | | | Mechanical properties | | | |
|---|---|---|---|---|---|---|---|---|---|---|---|---|---|---|---|---|---|---|
| | | Holding time between finish rolling temperature and 650° C. (s) | Coiling temperature (° C.) | Holding time between 650° C. and 750° C. (s) | Soaking temperature (° C.) | Soaking time (s) | Coating | Alloying | α area fraction (%) | P area fraction (%) | Balance area fraction (%) | α grain diameter (μm) | Nb (C, N) grain diameter (nm) | Nb (C, N) volume fraction (%) | TS (MPa) | YR | λ (%) | |
| No. | Steel | | | | | | | | | | | | | | | | | Category |
| 1 | A | 3 | 580 | 20 | 830 | 60 | Yes | No | 96 | 3 | M:1 | 8.4 | 14 | 0.012 | 385 | 0.77 | 154 | Invention example |
| 2 | B | 3 | 600 | 22 | 810 | 60 | No | No | 99 | 1 | — | 9.0 | 11 | 0.008 | 361 | 0.78 | 161 | Invention example |
| 3 | C | 5 | 550 | 25 | 840 | 60 | Yes | Yes | 92 | 6 | M:2 | 10.8 | 13 | 0.010 | 401 | 0.74 | 141 | Invention example |
| 4 | D | 3 | 560 | 23 | 800 | 60 | No | No | 100 | 0 | — | 10.6 | 8 | 0.004 | 319 | 0.66 | 155 | Comparative example |
| 5 | E | 5 | 570 | 24 | 820 | 90 | Yes | No | 87 | 2 | M:11 | 15.7 | 11 | 0.011 | 542 | 0.68 | 96 | Comparative example |
| 6 | F | 2 | 560 | 23 | 830 | 80 | Yes | Yes | 97 | 3 | — | 9.8 | 10 | 0.013 | 374 | 0.77 | 138 | Invention example |
| 7 | G | 5 | 560 | 20 | 790 | 60 | Yes | Yes | 86 | 2 | M:12 | 8.2 | 13 | 0.011 | 553 | 0.64 | 127 | Comparative example |
| 8 | H | 5 | 540 | 21 | 850 | 60 | No | No | 97 | 3 | — | 11.6 | 10 | 0.007 | 383 | 0.71 | 157 | Invention example |
| 9 | I | 3 | 560 | 20 | 860 | 60 | No | No | 97 | 3 | — | 6.4 | 14 | 0.038 | 379 | 0.84 | 135 | Invention example |
| 10 | J | 5 | 560 | 25 | 820 | 60 | Yes | Yes | 96 | 4 | — | 16.6 | 8 | 0.002 | 382 | 0.63 | 176 | Comparative example |
| 11 | K | 3 | 550 | 22 | 860 | 60 | No | No | 97 | 3 | — | 5.8 | 21 | 0.089 | 587 | 0.88 | 93 | Comparative example |
| 12 | L | 4 | 640 | 27 | 820 | 40 | Yes | Yes | 92 | 5 | M:3 | 10.4 | 16 | 0.014 | 411 | 0.71 | 146 | Invention example |
| 13 | M | 4 | 560 | 28 | 820 | 30 | Yes | No | 91 | 6 | M:3 | 7.2 | 11 | 0.013 | 417 | 0.75 | 143 | Invention example |
| 14 | A | 7 | 570 | 26 | 840 | 40 | Yes | Yes | 95 | 5 | — | 11.4 | 11 | 0.010 | 387 | 0.71 | 144 | Invention example |
| 15 | A | 15 | 650 | 25 | 820 | 40 | No | No | 95 | 5 | — | 15.8 | 52 | 0.012 | 325 | 0.68 | 152 | Comparative example |
| 16 | A | 5 | 520 | 22 | 820 | 60 | No | No | 98 | 2 | — | 10.8 | 7 | 0.009 | 412 | 0.72 | 134 | Invention example |
| 17 | A | 3 | 680 | 26 | 820 | 60 | Yes | Yes | 96 | 4 | — | 11.6 | 36 | 0.012 | 387 | 0.71 | 135 | Invention example |
| 18 | A | 4 | 470 | 25 | 820 | 60 | No | No | 95 | 5 | — | 15.8 | 53 | 0.008 | 324 | 0.67 | 142 | Comparative example |
| 19 | A | 3 | 720 | 21 | 820 | 60 | Yes | No | 96 | 4 | — | 17.8 | 57 | 0.012 | 320 | 0.65 | 150 | Comparative example |
| 20 | A | 5 | 580 | 17 | 820 | 60 | No | No | 97 | 3 | — | 10.2 | 14 | 0.011 | 399 | 0.78 | 153 | Invention example |
| 21 | A | 3 | 580 | 10 | 820 | 60 | Yes | No | 96 | 4 | — | 17.5 | 15 | 0.011 | 401 | 0.69 | 146 | Comparative example |
| 22 | A | 2 | 570 | 19 | 790 | 40 | No | No | 96 | 4 | — | 11.4 | 13 | 0.012 | 378 | 0.71 | 153 | Invention example |
| 23 | A | 2 | 580 | 22 | 860 | 50 | Yes | No | 96 | 4 | — | 10.8 | 14 | 0.010 | 389 | 0.70 | 167 | Invention example |
| 24 | A | 3 | 580 | 21 | 730 | 50 | Yes | Yes | 95 | 3 | M:1, θ:1 | * | 11 | 0.011 | 356 | 0.78 | 98 | Comparative example |
| 25 | A | 3 | 560 | 25 | 950 | 60 | Yes | No | 96 | 4 | — | 18.2 | 16 | 0.011 | 322 | 0.65 | 164 | Comparative example |
| 26 | A | 4 | 570 | 24 | 820 | 100 | Yes | Yes | 95 | 5 | — | 9.6 | 12 | 0.012 | 374 | 0.72 | 152 | Invention example |
| 27 | A | 3 | 580 | 25 | 840 | 200 | No | No | 95 | 5 | — | 15.6 | 13 | 0.012 | 326 | 0.69 | 155 | Comparative example |
| 28 | A | 3 | 750 | 25 | 840 | 60 | Yes | No | 98 | 2 | — | 15.6 | 55 | 0.013 | 319 | 0.66 | 155 | Comparative example |
| 29 | A | 3 | 430 | 25 | 840 | 60 | Yes | No | 96 | 4 | — | 15.8 | 54 | 0.012 | 316 | 0.65 | 155 | Comparative example |

TABLE 2-continued

| | | Hot rolling Holding time between finish rolling temperature and 650° C. (s) | Coiling temperature (° C.) | Annealing and coating Holding time between 650° C. and 750° C. (s) | Soaking temperature (s) | Soaking time (s) | Coating | Alloying | Steel microstructure α area fraction (%) | P area fraction (%) | Balance area fraction (%) | α grain diameter (μm) | Nb (C, N) grain diameter (nm) | Nb (C, N) volume fraction (%) | Mechanical properties TS (MPa) | YR | λ (%) | Category |
|---|---|---|---|---|---|---|---|---|---|---|---|---|---|---|---|---|---|---|
| No. | Steel | | | | | | | | | | | | | | | | | |
| 30 | A | 3 | 580 | <u>5</u> | 840 | 60 | Yes | No | 95 | 5 | — | <u>16.1</u> | 12 | 0.012 | 375 | <u>0.69</u> | 155 | Comparative example |
| 31 | A | 3 | 580 | <u>8</u> | 840 | 60 | Yes | No | 97 | 3 | — | <u>16.2</u> | 11 | 0.012 | 377 | <u>0.68</u> | 155 | Comparative example |

(Note 1):
Underlined items are outside the range of the disclosed embodiments or an unfavorable property.
(Note 2):
*means unmeasurable because of the remaining unrecrystallized microstructure.

Table 2 shows the results of the observation of microstructure and the tensile test. The high-strength steel sheet Nos. 1 to 3, 6, 8 and 9, 12 to 14, 16 and 17, 20, 22 and 23, and 26, which satisfied all the requirements of the disclosed embodiments, were the high-strength steel sheets targeted in the disclosed embodiments which have a high yield ratio and excellent stretch flangeability. In contrast, the high-strength steel sheet Nos. 4 and 5, 7, 10 and 11, 15, 18 to 19, 21, 24 and 25, and 27 to 31, in which the steel composition or the production conditions were out of the range of the disclosed embodiments, did not have the desired microstructure. That is, the high-strength steel sheet Nos. 4 and 5, 7, 10 and 11, 15, 18 to 19, 21, 24 and 25, and 27 to 31 were not the high-strength steel sheets targeted in the disclosed embodiments.

INDUSTRIAL APPLICABILITY

The high-strength steel sheet according to the disclosed embodiments may be suitably used in an application that requires a high yield ratio and excellent stretch flangeability, such as automotive sheet components.

The invention claimed is:

1. A high-strength steel sheet having a chemical composition comprising, by mass %:
C: 0.02% or more and less than 0.10%,
Si: less than 0.10%,
Mn: less than 1.0%,
P: 0.10% or less,
S: 0.020% or less,
Al: 0.01% or more and 0.10% or less,
N: 0.010% or less,
Nb: 0.005% or more and less than 0.070%, and
the balance being Fe and inevitable impurities,
wherein the steel sheet has a microstructure including, by area fraction, ferrite: 85% or more, pearlite: 0% to 15%, and a total of martensite, retained austenite and cementite: 0% to 3%,
an average crystal grain diameter of the ferrite is 15.0 μm or less,
an average grain diameter of a Nb carbide is in a range of 5 to 36 nm, and
the amount of Nb carbide precipitate is 0.005% to 0.050% in terms of volume fraction.

2. The high-strength steel sheet according to claim 1, wherein the composition further comprises at least one element selected from the group consisting of, by mass %, Cr: 0.3% or less, Mo: 0.3% or less, B: 0.005% or less, Cu: 0.3% or less, and Ni: 0.3% or less.

3. The high-strength steel sheet according to claim 2, further comprising a hot-dip galvanizing layer deposited on a surface of the high-strength steel sheet.

4. The high-strength steel sheet according to claim 3, wherein the hot-dip galvanizing layer is a galvannealed layer.

5. The high-strength steel sheet according to claim 1, further comprising a hot-dip galvanizing layer deposited on a surface of the high-strength steel sheet.

6. The high-strength steel sheet according to claim 5, wherein the hot-dip galvanizing layer is a galvannealed layer.

7. The high-strength steel sheet according to claim 1, wherein the average grain diameter of the Nb carbide is in a range of 5 to 30 nm.

8. The high-strength steel sheet according to claim 1, wherein the average grain diameter of the Nb carbide is in a range of 10 to 36 nm.

9. The high-strength steel sheet according to claim 1, wherein the average crystal grain diameter of the ferrite is 10.0 μm or less.

10. A method for producing the high-strength steel sheet according to claim 1, the method comprising:
hot-rolling a slab to obtain a hot-rolled steel sheet;
cooling the resulting hot-rolled steel sheet such that the hot-rolled steel sheet is held in a temperature range of a finish-rolling temperature to 650° C. for 10 seconds or less and 1 second or more;

coiling the hot-rolled steel sheet at 500° C. to 700° C.;

cold-rolling the hot-rolled steel sheet to obtain a cold-rolled steel sheet; and subjecting the resulting cold-rolled steel sheet to an annealing treatment in a continuous annealing furnace, wherein the annealing treatment includes holding the cold-rolled steel sheet in a temperature range of 650° C. to 750° C. for 15 seconds or more when heating is performed and subsequently soaking the cold-rolled steel sheet with a soaking temperature in a range of 760° C. to 880° C. for a soaking time of 120 seconds or less.

11. The method according to claim 10, the method further comprising, subsequent to the annealing treatment, performing hot-dip galvanizing on a surface of the high-strength steel sheet to obtain a hot-dip galvanizing layer.

12. The method according to claim 11, the method further comprising subjecting the hot-dip galvanizing layer to an alloying treatment.

13. The method according to claim 10, wherein the soaking temperature is in a range of 790° C. to 880° C.

14. A method for producing the high-strength steel sheet according to claim 2, the method comprising:

hot-rolling a slab to obtain a hot-rolled steel sheet;

cooling the resulting hot-rolled steel sheet such that the hot-rolled steel sheet is held in a temperature range of a finish-rolling temperature to 650° C. for 10 seconds or less and 1 second or more;

coiling the hot-rolled steel sheet at 500° C. to 700° C.;

cold-rolling the hot-rolled steel sheet to obtain a cold-rolled steel sheet; and subjecting the resulting cold-rolled steel sheet to an annealing treatment in a continuous annealing furnace, wherein the annealing treatment includes holding the cold-rolled steel sheet in a temperature range of 650° C. to 750° C. for 15 seconds or more when heating is performed and subsequently soaking the cold-rolled steel sheet with a soaking temperature in a range of 760° C. to 880° C. for a soaking time of 120 seconds or less.

15. The method according to claim 14, the method further comprising, subsequent to the annealing treatment, performing hot-dip galvanizing on a surface of the high-strength steel sheet to obtain a hot-dip galvanizing layer.

16. The method according to claim 15, the method further comprising subjecting the hot-dip galvanizing layer to an alloying treatment.

17. The method according to claim 14, wherein the soaking temperature is in a range of 790° C. to 880° C.

\* \* \* \* \*